(12) United States Patent
Jenkinson

(10) Patent No.: US 8,996,166 B2
(45) Date of Patent: Mar. 31, 2015

(54) TOUCH SCREEN TESTING PLATFORM

(75) Inventor: David Ross Jenkinson, Auburn, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 868 days.

(21) Appl. No.: 12/964,427

(22) Filed: Dec. 9, 2010

(65) Prior Publication Data

US 2012/0146956 A1      Jun. 14, 2012

(51) Int. Cl.
*G06F 19/00*      (2011.01)
*G06F 3/041*      (2006.01)

(52) U.S. Cl.
CPC ............ *G06F 3/0418* (2013.01); *Y10S 901/14* (2013.01)
USPC .......... 700/245; 700/246; 700/250; 700/251; 700/253; 700/257; 700/254; 700/258; 700/262; 345/174; 901/14

(58) Field of Classification Search
USPC .................................................. 700/245–264
See application file for complete search history.

(56) References Cited

U.S. PATENT DOCUMENTS

| | | | |
|---|---|---|---|
| 4,786,867 A | 11/1988 | Yamatsu | |
| 5,798,627 A | 8/1998 | Gilliland et al. | |
| 6,008,636 A | 12/1999 | Miller et al. | |
| 6,249,718 B1 | 6/2001 | Gilliland et al. | |
| 6,282,460 B2 | 8/2001 | Gilliland et al. | |
| 6,341,259 B1 | 1/2002 | Gutierrez et al. | |
| 6,708,132 B1 | 3/2004 | Gutierrez et al. | |
| 6,825,680 B1 | 11/2004 | Kogan et al. | |
| 7,167,197 B2 | 1/2007 | Hill et al. | |
| 7,831,337 B2 | 11/2010 | Greenspan | |
| 2003/0179296 A1 | 9/2003 | Hill et al. | |
| 2005/0135972 A1 | 6/2005 | Lemme et al. | |
| 2005/0231595 A1 | 10/2005 | Wang et al. | |
| 2005/0244049 A1 | 11/2005 | Onishi et al. | |
| 2006/0048025 A1 | 3/2006 | Filipovic | |
| 2006/0063599 A1 | 3/2006 | Greenspan | |
| 2007/0025443 A1 | 2/2007 | Inokuma | |
| 2009/0265035 A1 | 10/2009 | Jenkinson et al. | |
| 2014/0309775 A1 | 10/2014 | Jenkinson | |

FOREIGN PATENT DOCUMENTS

EP      1713239(A1)      10/2006
JP      2003124871(A)      4/2003

OTHER PUBLICATIONS

Office Action for related U.S. Appl. No. 12/239,271, mailed Jun. 19, 2012, 12 pages.
International Search Report for PCT/US2009/041094, dated Jun. 24, 2009, 3 pgs.

*Primary Examiner* — Bhavesh V Amin
(74) *Attorney, Agent, or Firm* — Lee & Hayes, PLLC

(57) ABSTRACT

A touch screen testing platform may be used to perform repeatable testing of a touch screen enabled device using a robotic device tester and a controller. Prior to running a test, the controller and/or robot may be calibrated to determine a planar surface of the touch screen and to establish a relative coordinate system across the touch screen. The controller may then be programmed to allow a robot to engage the touch screen using known input zones designated using the coordinate system. The platform may employ object recognition to determine and interact with content rendered by the device. The platform may use various types of tips that engage the touch screen, thereby simulating human behavior. The platform may perform multi-touch operations by employing multiple tips that can engage the touch screen simultaneously.

20 Claims, 10 Drawing Sheets

TOUCH SCREEN TESTING PLATFORM

RELATED APPLICATION

This patent application is related to co-pending, commonly-owned U.S. patent application Ser. No. 12/239,271 entitled "Robotic Device Tester" filed on Sep. 26, 2008, which application is hereby incorporated by reference.

BACKGROUND

The electronics industry is a dynamic industry where new products are continually being released and implemented for use by people and businesses in the marketplace. Many new products include touch screens that enable a user to input commands to an electronic device by touching the screen of the device rather than relying on traditional inputs such as buttons and directional control pads.

Before a product (e.g., device, system, software, and/or hardware) is implemented in the market or made available for consumption, the product often undergoes testing to ensure that the product is fully functional and operational upon deployment. The testing may be used to measure durability, battery performance, application performance, screen sensitivity, or other quantifiable aspects of the operation of the electronic device subjected to the testing.

Traditional testing platforms are configured to test electronic devices that have traditional inputs, such a buttons, which have a fixed location on the device. However, with touch screen enabled devices, an application designer may place input controls anywhere within the display screen, which may require user interaction to determine a location of an input control used to perform a desired action.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

A touch screen testing platform may be used to perform repeatable testing of a touch screen enabled electronic device, such as a telecommunications device that includes a touch screen display. During a test scenario, a robotic device tester may initiate various operations of the electronic device by engaging a touch screen of the electronic device. The operations in the test scenario may include, without limitation, initiating voice calls, transmitting and receiving data (messages, videos, music, etc.), running applications, and performing other operations. By running scenarios such as the example test scenario described above, electronic devices may be tested in a laboratory environment using an automated process and include relatively quick cycle times, making the tests relatively inexpensive and repeatable. Results of the tests may be analyzed to determine performance of the electronic device, which may be compared to threshold performance metrics or used for other purposes.

Prior to running a test, the platform may be calibrated to determine a planar surface defined by the touch screen and to establish a coordinate system across the planar surface. The controller may then be programmed to interact with the touch screen at known input locations using the coordinate system.

In some instances, the controller may use object recognition to determine content and/or commands rendered on the touch screen by a device. For example, the object recognition may determine a display of a notification message and associated commands such as "cancel" or "okay" that enable continued operation of the device.

The platform may employ various types of tips that engage the touch screen to simulate human interaction with the touch screen. For example, the tips may include different shapes, sizes, and materials, which may be representative of fingers or objects that humans use to engage the touch screen. Further, the platform may perform multi-touch operations by employing multiple tips that can engage the touch screen simultaneously to simulate human multi-touch interactions with the touch screen.

The touch screen testing platform described herein may be implemented in a number of ways. Example implementations are provided below with reference to the following figures.

Illustrative Test Environment

Figure 1:
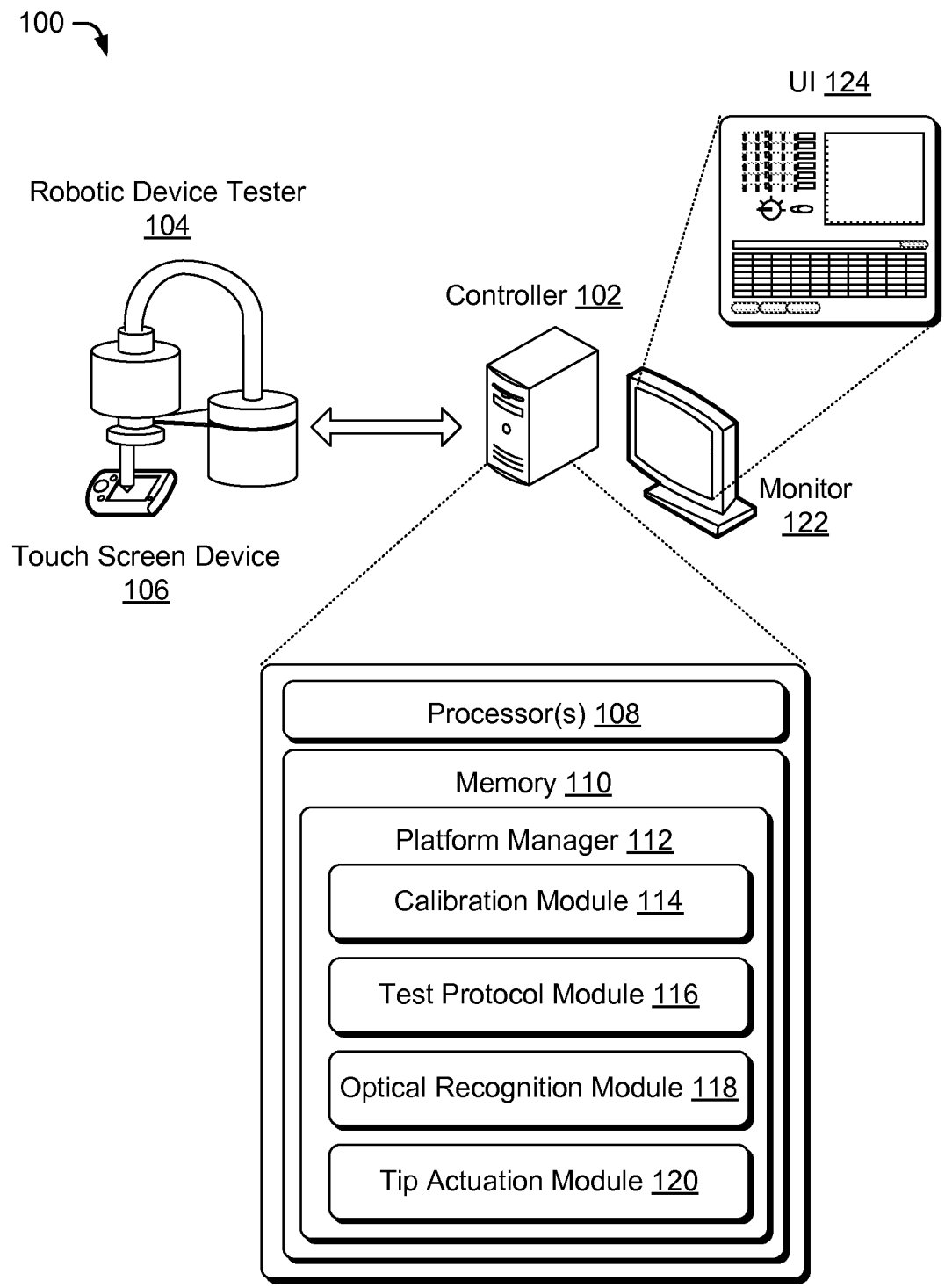
FIG. 1 is an illustrative environment including a robotic device tester and a controller to perform testing on a touch screen enabled electronic device.

FIG. 1 is an illustrative environment 100 that includes a controller 102 and a robotic device tester 104 to perform testing on a touch screen enabled electronic device ("touch screen device") 106. The robotic device tester 104 may operate in accordance with commands that are received from the controller 102. For example, the controller 102 may transmit a command to the robotic device tester 104. The robotic device tester 104 may then execute a movement to cause a tip of a moveable arm to engage a touch screen display of the touch screen device 106 and thereby initiate an operation to be performed by the touch screen device 106 (e.g., initiate a telephone call, interact with an application, etc.). In some embodiments, the robotic device tester 104 may obtain data from the touch screen device 106, such as via a camera, and transmit the data (e.g., images or other data) to the controller 102 for further processing.

As illustrated, the controller 102 may be equipped with one or more processor(s) 108 and memory 110. The memory 110 may include applications, modules, and/or data. In some embodiments, the memory 110 may include a platform manager 112 to interact with the robotic device tester 104. The platform manager 112 may include a calibration module 114, a test protocol module 116, an optical recognition module 118, and a tip actuation module 120, among other possible modules that enable the controller 102 to interact with the robotic device tester 104, and thereby perform test scenarios on the touch screen device 106. Each module is discussed in turn.

The calibration module 114 may be used to calibrate operation of the robotic device tester 104. In some embodiments, after the touch screen device 106 is securely mounted to a testing fixture, the controller 102 may identify and store various locations of the touch screen display as part of the calibration operation. The calibration module 114 may identify a planar surface of the touch screen display and may create a reference coordinate system within the planar surface to enable a user (e.g., engineer, researcher, etc.) to designate locations of various touch screen inputs. For example, the user may designate locations of virtual buttons representative of a QWERTY keyboard that are displayed by the touch screen device 106.

The test protocol module 116 may generate and transmit instructions that control movement of the robotic device tester 104, which performs one or more tests by interacting with the touch screen device 106. The test protocol module 116 may provide instructions to perform stress testing, repetitive testing, performance testing (e.g., speed, battery life, etc.), screen sensitivity testing, or other types of testing.

The optical recognition module 118 may identify imagery rendered by the touch screen display of the touch screen device 106. The optical recognition module 118 may convert imagery into text using optical character recognition (OCR). In some embodiments, the optical recognition module 118 may also identify various objects, such as virtual buttons, links, or commands that are displayed by the touch screen device and may be interacted with using the robotic device tester 104.

The tip actuation module 120 may select and move tips to engage the touch screen display of the touch screen device 106. The tips may be synthetic pads (e.g., rubberized, plastic, etc.), that are moveably controlled by the robotic device tester 104 to engage the touch screen display in accordance with instructions from the test protocol module 116. In some embodiments, the tip actuation module 120 may select a tip from multiple available tips. In various embodiments, the tip actuation module 120 may be used to controllably perform multi-touch operations on the touch screen device 106 by moving two or more tips that simultaneously engage the touch screen display.

In accordance with various embodiments, the controller may include a monitor 122, which may display a user interface (UI) 124. The UI may enable the user to interact with the various modules of the platform manager 112.

Although FIG. 1 only shows one controller, the components/modules of the controller 102, or portions of the components/modules may be implemented on separate computing devices, such as a separate computing device dedicated to the robotic device tester 104 and a separate computing device dedicated to running testing protocols. Thus, the various components described in FIG. 1 may be implemented, in whole or in part, across any combination of different computing devices in accordance with this disclosure.

Figure 2:
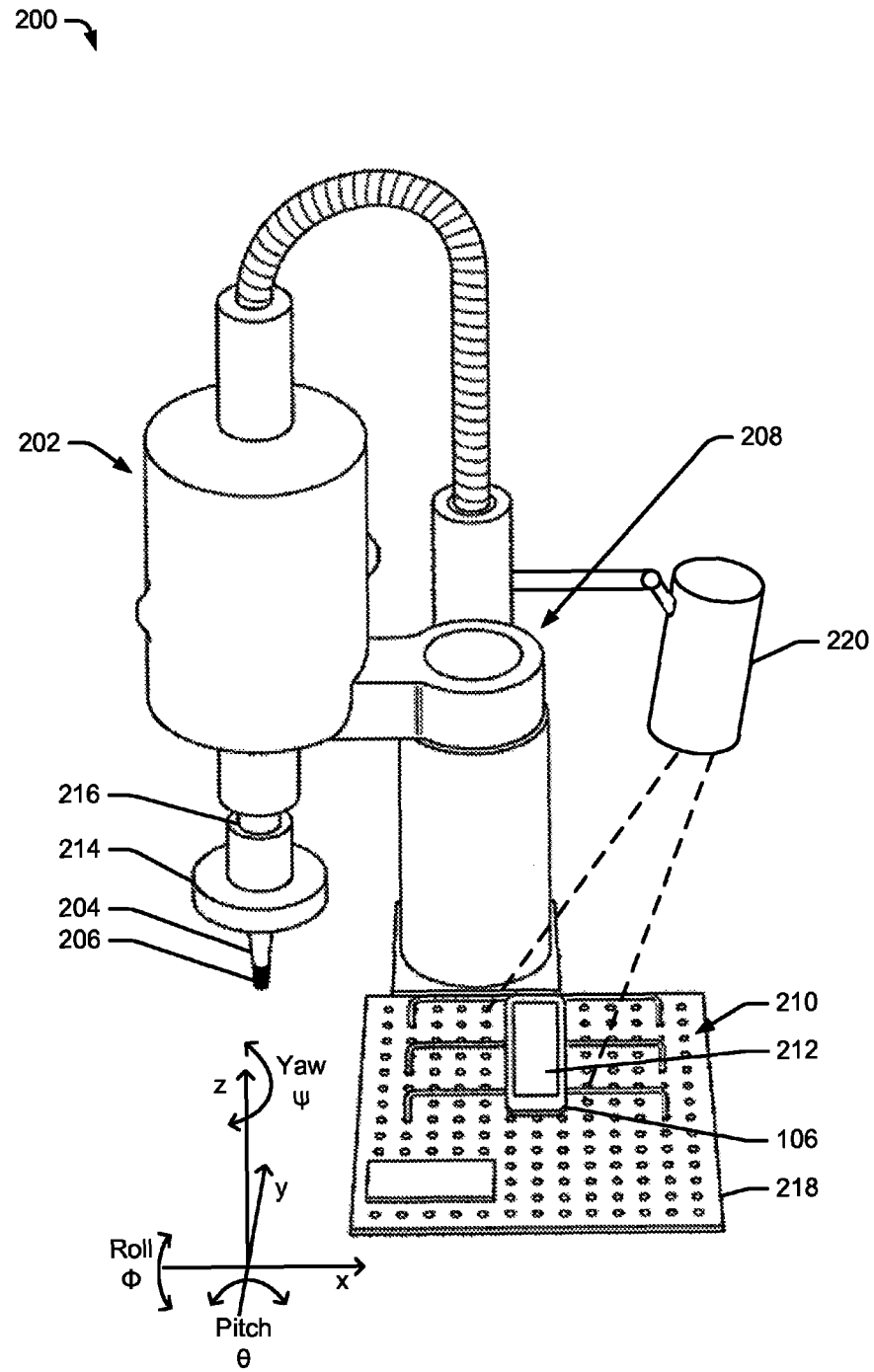
FIG. 2 is an isometric view of an illustrative robotic device tester to test a touch screen enabled electronic device.

FIG. 2 is an isometric view of an illustrative robotic device tester 200 to test the touch screen device 106. The robotic device tester 200 may include a robot 202 that is configured to control movement of an arm 204 with a tip 206 using a robotic arm 208. The touch screen device 106 may be any device that employs a touch screen, such as telecommunications device, a tablet computer, a television, or other touch screen enabled electronic devices.

In accordance with various embodiments, the robot 202 may move the tip 206 to engage a selected portion of the touch screen device 106 mounted in a device fixture 210, and thereby activate commands on the touch screen device. The tip 206 may be mounted on a distal end of the arm 204. In some embodiments, the tip 206 may be formed using a synthetic material (e.g. rubber, polymer material, etc.), such as a conductive material that enables detection by the touch screen device 106 when the tip engages the touch screen 212. The tip 206 may be used to activate controls of the touch screen device 106 such as physical buttons and virtual buttons (i.e., buttons or commands activated by the touch screen 212).

In some embodiments, the robot 202 is configured to move the arm 204 and tip 206 in six degrees of freedom using the robotic arm 208, which include translation along three axes to enable movement in the x-direction, y-direction, and z-direction, and rotation about three perpendicular axes for roll ($\phi$), pitch ($\theta$), and yaw ($\psi$). In various embodiments, the arm 204 may be mounted on a plate 214, which may rotate about the z axis (yaw) to move the arm about an axis of rotation. The rotation of the plate 214 may enable the robot 202 to perform micro adjustments of the location of the arm 204 and tip 206, and may also enable the tip to perform "swipe" operations on the touch screen device 106, which may simulate a human interaction of dragging a finger or pointer across a portion of the touch screen 212.

The plate 214 may be configured with a single arm or multiple arms. In some embodiments, the multiple arms may be configured with different tips, which may selectively be used to engage the touch screen 212. For example, the tips may be of different sizes, materials, and so forth, and used to simulate interaction with the touch screen device by humans in a deployed environment. In various embodiments, two or more of the multiple arms may be configured to simultaneously or nearly simultaneously engage the touch screen device to perform multi-touch operations, such a zooming in/out or initiating other commands using the touch screen device. Various illustrative configurations of the plate 214 are shown and described with reference to FIGS. 8-10.

In various embodiments, the robot 202 may be capable of measuring a force of engagement of the tip against a surface, such as a display of the touch screen device 106. The robot 202 may include a load sensor 216 (e.g., a load cell, etc.) to determine a force applied by the tip 206 during engagement of the touch screen 212.

In accordance with some embodiments, the device fixture 210 may be used to secure the touch screen device 106. In some embodiments, the touch screen device 106 may be securely mounted on the device fixture 210 such that the touch screen 212 is parallel or nearly parallel to a base 218 of the device fixture 210. A calibration process, which is described next with reference to FIG. 3, enables non-parallel mounting or nearly parallel mounting of the touch screen device in the device fixture 210.

In some embodiments, the robot testing device 200 may include a camera 220. The camera 220 may be connected to the controller 102, which may store the imagery and perform image processing such as via the optical recognition module 118. Under control of the controller 102, the camera may record imagery of the touch screen device. For example, the camera may record rendered imagery from the touch screen device that shows a prompt on the touch screen 212. The optical recognition module 118 may analyze the recorded imagery, which may be used by the platform manager 112 during selection of a subsequent instruction to be performed by the robot 202. The camera 220 may be capable to recording still images, moving images (video), or both. In some embodiments, multiple cameras may be implemented with the robot test device 200 to record imagery from various angles, perspective, and so forth. In some embodiments, the robot 202 may include other sensors that can sense, measure, and/or record feedback from the touch screen device, such as a sensor that can detect haptic feedback from the touch screen device.

Illustrative Calibration

Figure 3:
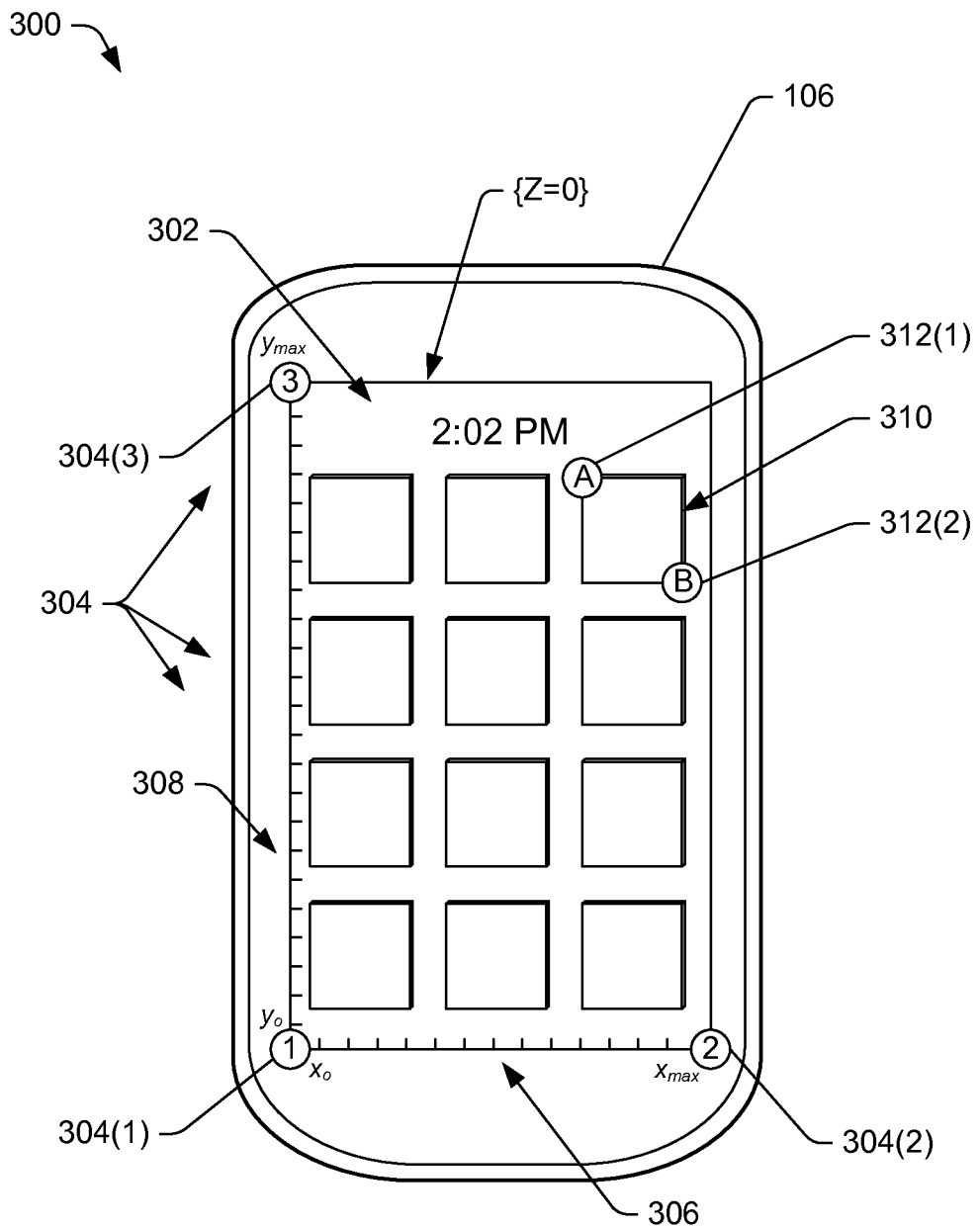
FIG. 3 is a schematic diagram of the touch screen enabled electronic device with illustrative calibration references to calibrate the robotic device tester, the controller, or both.

FIG. 3 is a schematic diagram of the touch screen device 106 with illustrative calibration references 300 to calibrate the robotic device tester 200, the controller 102, or both. The calibration module 114 may perform the calibration after the touch screen device 106 is securely mounted in the device fixture 210 and before the test protocol module performs a testing protocol to actuate the robot to selectively cause the tip 206 to engage portions of a touch screen 302 of the touch screen device 106. As discussed below, the calibration may create a reference coordinate system that aligns the touch screen parallel to the x-axis and y-axis at z=0.

The calibration references 300 may include display corner references 304, which may include at least three individual display corner references 304(1), 304(2), and 304(3). During calibration, the tip 206 may be moved to each of the individual display corner references 304(1), 304(2), and 304(3). After the tip engages one of the display corner references, which can be any of the corners of the touch screen 302, the controller 102, via the calibration module 114, may store a three dimensional position of the display corner reference using coordinates x, y, and z. The robot 202 may move to each of the individual display corner references 304(1), 304(2), and 304(3) and store the respective positions.

The calibration module 114 may identify a plane that overlaps the touch screen 302 based on the display corner references 304. In addition, the calibration module 114 may create a reference coordinate system based on the stored positions. The calibration module 114 may set the z-axis to be perpendicular with the touch screen 302 where z=0 is the surface of the touch screen 302. The calibration module 114 may establish a reference coordinate system across the display based in part on the detected positions of the display corner references 304. The coordinate system may include an x-axis range 306 and a y-axis range 308 that cover the touch screen 302. In some embodiments, the display corner reference 304(1) may be set as $\{x, y, z\}=\{0, 0, 0\}=\{x_0, y_0, z_0\}$, the display corner reference 304(2) may be set as $\{x, y, z\}=\{x_{max}, y_0, 0\}$, and the display corner reference 304(3) may be set as $\{x, y, z\}=\{x_0, y_{max}, 0\}$, where $x_{max}$ and $y_{max}$ represent the maximum width and height of the display, respectively. In this configuration, the tip 206 engages the display when z=0, $x_0<x<x_{max}$, and $y_0<y<y_{max}$.

In some embodiments, the test protocol module 116 may perform touch or slide operations based on a command and coordinates, such as: {touch x=10, y=5}, {slide x=10-15, y=5}, etc., where each operation has a specified location(s) based on the coordinates. The test protocol module 115 may also perform a touch or slide operation by specifying major coordinate locations, such as {x=10, y=5, z=1} followed by {x=10, y=5, z=0}, which may direct the tip to touch the screen. A slide operation may occur when a next coordinate is {x=15, y=5, z=0}, which includes a slide of "5" in the x-direction.

In addition to establishing a reference coordinate system across the touch screen 302, the robot 202 and/or controller 102 may be programmed to identify particular regions or zones of the display that are associated with known functionality. For example, a zone 310 may be used to locate a selectable icon that launches an application or performs other functionality of the touch screen device (e.g., places a call, locks the device, etc.). The zone 310 may be defined using two or more locations, such as a first location 312(1) and a second location 312(2) that define opposite corners of a rectangular zone, since z=0 and is aligned with the touch screen. In some embodiments, the zones may be defined to locate individual characters (letters, numbers, and/or symbols) of a keyboard. Thus, each character may have a predetermined zone, which enables a programmer to direct the robot 202 to enter data using a virtual keyboard by having the tip 206 engage the touch screen 302 at each respective virtual keypad or button represented at a zone of the touch screen. The programmer may then input commands such as "select 'a'" to select the key associated with the letter "a" rather than by inputting coordinates for the location of the key. Further, this configuration may be helpful in providing input based on optical character recognition (OCR), such as by inputting data back into the touch screen device 106 based on data received and analyzed using OCR.

Figure 4:
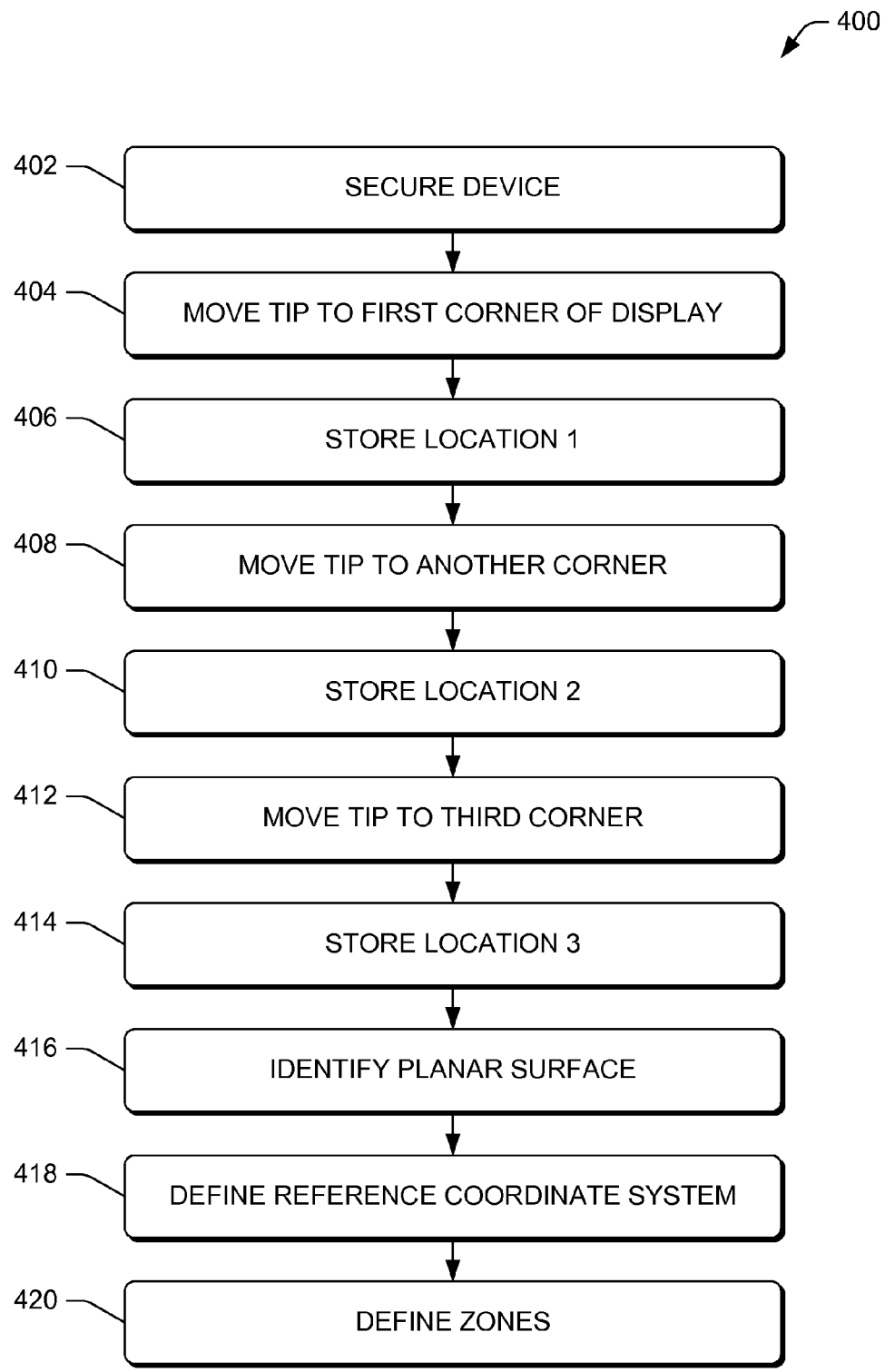
FIG. 4 is a flow diagram of an illustrative process of calibrating the controller of the robotic device tester.

FIG. 4 is a flow diagram of an illustrative process of calibrating the controller of the robotic device tester. The process 400 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to the process 400, shall be interpreted accordingly.

At 402, the touch screen device 106 may be secured in the device fixture 210 to orient the touch screen 302 in an upward direction that is parallel or nearly parallel to the base 218 of the device fixture.

At 404, the tip 206 may be moved to the display corner reference 304(1) at $\{x_0, y_0\}$. For example, the tip 206 may be moved under control of the robot 202 by the controller 102, by manual movement by an operator, or by a combination of both. At 406, the calibration module 114 may store the location of the display corner reference 304(1).

At 408, the tip 206 may be moved to the display corner reference 304(2) at $\{x_{max}, y_0\}$. At 410, the calibration module 114 may store the location of the display corner reference 304(2).

At 412, the tip 206 may be moved to the display corner reference 304(3) at $\{x_0, y_{max}\}$. At 414, the calibration module 114 may store the location of the display corner reference 304(3).

At 416, the calibration module 114 may identify the planar surface of the touch screen 302 based on the display corner references 304(1), 304(2), and 304(3). The calibration module 114 may define the plane that is aligned with the surface of the touch screen 302 as being parallel to the x-axis and y-axis and perpendicular to the z-axis. In some embodiments, a position of the robot 202 may be adjusted relative to the defined plane to align with the newly established z-axis by rotating the robot 202 via the roll (φ) and/or pitch (θ). In some embodiments, the robot 202 and/or the control 102 may automatically adjust for differences between a default coordinate system and a relative coordinate system that is defined by the calibration process 400.

At 418, the calibration module 114 may define an x-y coordinate system parallel to the touch screen 302. The x-y coordinate system may enable a user to program a location of zones, virtual commands (buttons, keys, etc.) or other features that are displayed by the touch screen 302. At 420, the calibration module 114 may define zones within the touch screen using the x-y coordinate system defined at the operation 418.

In some embodiments, the operations 404 to 414 may be performed for additional tips, arms, or both when different configurations are used during a test. For example, when the plate 214 includes multiple arms, each arm may be calibrated using the operations 404 to 414 to identify a respective coordinate system for the arm. This may enable compensation for tips that are different sizes or otherwise not aligned during the initial calibration for another tip.

Illustrative Operation

Figure 5:
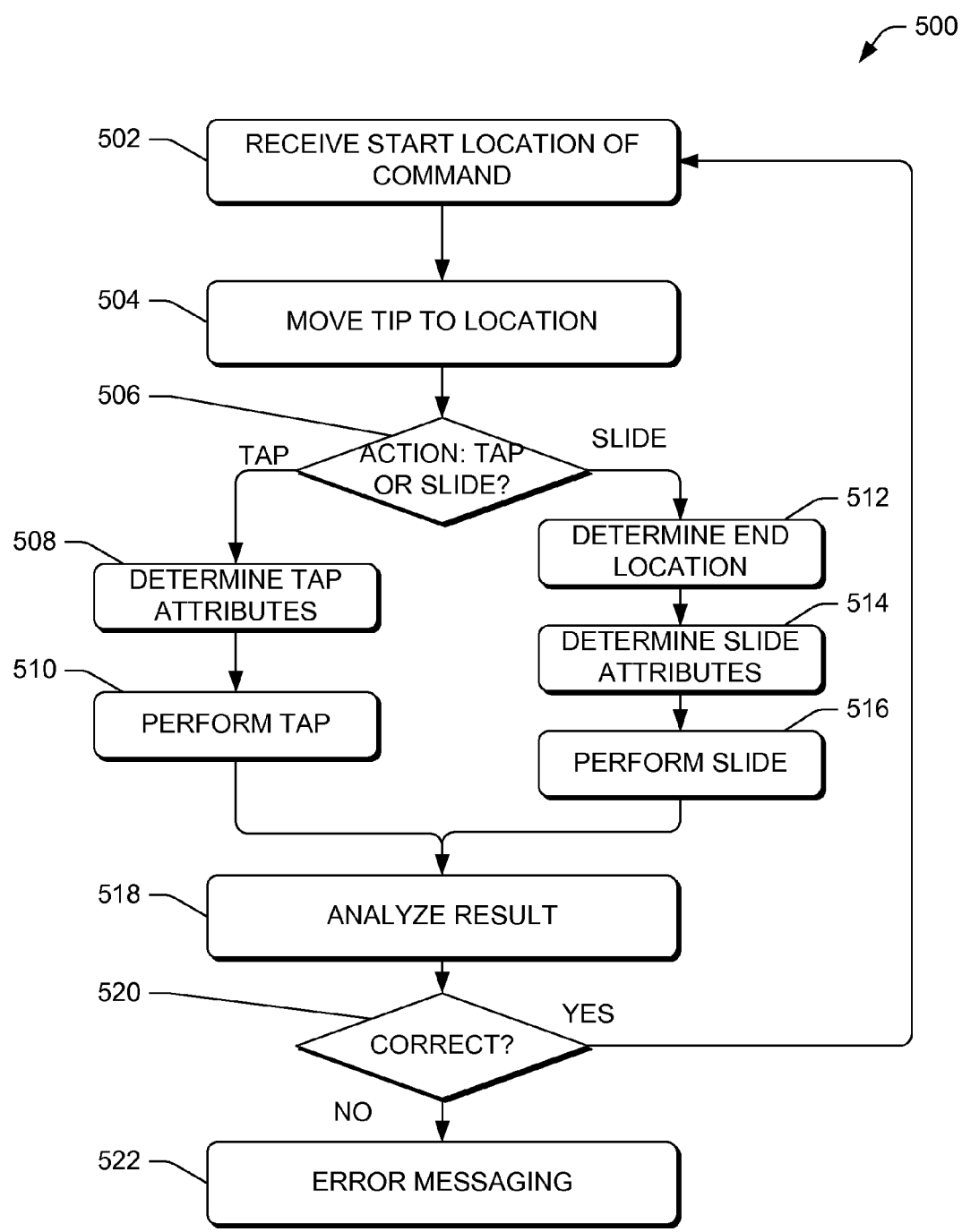
FIG. 5 is a flow diagram of an illustrative process to perform testing of the touch screen enabled electronic device with the robotic device tester.

FIG. 5 is a flow diagram of an illustrative process 500 to perform testing of the touch device 106 with the robotic device tester 200 and controller 102. The test protocol module 116 may provide instructions to the robot 200, which in turn may execute the commands during a test to selectively cause one or more tips to engage the touch screen 302 to interact with the touch screen device 106.

At 502, the test protocol module 116 may receive a start location of a command. For example the command may be defined by a time t and a coordinate of x, y, and z.

At 504, the test protocol module 116 may instruct the robot 200 to move the tip 206 to a location (e.g., $x_1$, $y_2$, z=0) to engage the touch screen.

At 506, the test protocol module 116 may determine whether to perform a tap or a slide action. A tap action may occur by locking the x and y location and varying the z location such that the tip 206 engages a location on the touch screen 302 and then disengages at the same location. A slide action may be performed when the tip engages the touch screen 302 and then traverses across the planar surface (z=0) to a second location before the tip disengages from the touch screen.

When the test protocol module 116 executes a tap action at the decision operation 506, the test protocol module 116 may determine tap attributes at 508. The tap attributes may include an amount of engagement force to be applied against the touch screen during the tap action, an amount to time to cause the tip to remain engaged against the touch screen, and/or other attributes. As an example, a durability test of the touch screen may be performed by include high force touches performed by the tips to simulate a user (child, etc.) forcibly touching the touch screen. In some embodiments, the tap attributes may also specify particular tip to be used to perform the tap when multiple tips are available (e.g., the robot has multiple arms where each arm has a tip, etc.). The tap action may be performed at 510.

When the test protocol module 116 executes a swipe action at the decision operation 506, the test protocol may determine an end location of the swipe at 512 that includes a different x location, y location, or both than the location specified at the operation 504. At 514, the test protocol module 116 may determine the slide attributes, which may include an amount of engagement force to be applied during the slide action (engagement of the touch screen 302), an amount to time to cause the tip to remain engaged against the touch screen, and/or other attributes. In some embodiments, the slide attributes may also specify a particular tip to be used to perform the tap when multiple tips are available. The slide action may be performed at 516. In some embodiments, the slide action may include a curved trajectory of the tip, which may be caused by the rotating of the plate 214 that moves the arm 204. The curved trajectory may mimic an input (touch) by a user (human) when a user interacts with the touch screen 302. The slide action may also be performed by a linear or nearly linear movement from first location $\{x_1, y_1\}$ to a second location $\{x_2, y_2\}$.

In various embodiments, at 518, the test protocol module 116 may analyze a result of the slide or the tap. The analysis may be performed using sensory information such as the camera 220, a microphone, a haptic sensor, or other sensors or devices. The analysis may confirm that the command was properly executed by the robot and/or received by the touch screen device 106.

At 520, the test protocol module 116 may determine whether the result analyzed at the operation 518 is correct (e.g., an intended result). When the result is not correct, the test protocol module 116 may continue along the route "no" and issue an error message. In some embodiments, the test protocol module 116 may attempt to re-execute the command via some of the actions of 502 to 518 as discussed above for a predetermined number or times and may cause a delay between each attempt. When the result is correct, the test protocol module 116 may continue along the route "yes" and perform a next action by repeating some of the operations 502 to 518.

In some embodiments, the process 500 may also be used to cause the tip 206 to engage physical buttons that are located adjacent or proximate to the touch screen 302. For example, the test protocol module 116 may cause the tip 206 to tap virtual buttons on the touch screen to input a telephone number, which may be initiated after the tip 206 depress a physical button that is configured to imitate the call and is located proximate the touch screen.

In addition to activating buttons, the process 500 may also be used to perform other touch related tasks such as move icons on a work environment, adjust settings of the device, input text, or perform other actions that may be received by the touch screen via interaction between the tip 206 and the touch screen 302 and/or physical buttons.

Illustrative Testing using Object Recognition

Figure 6:
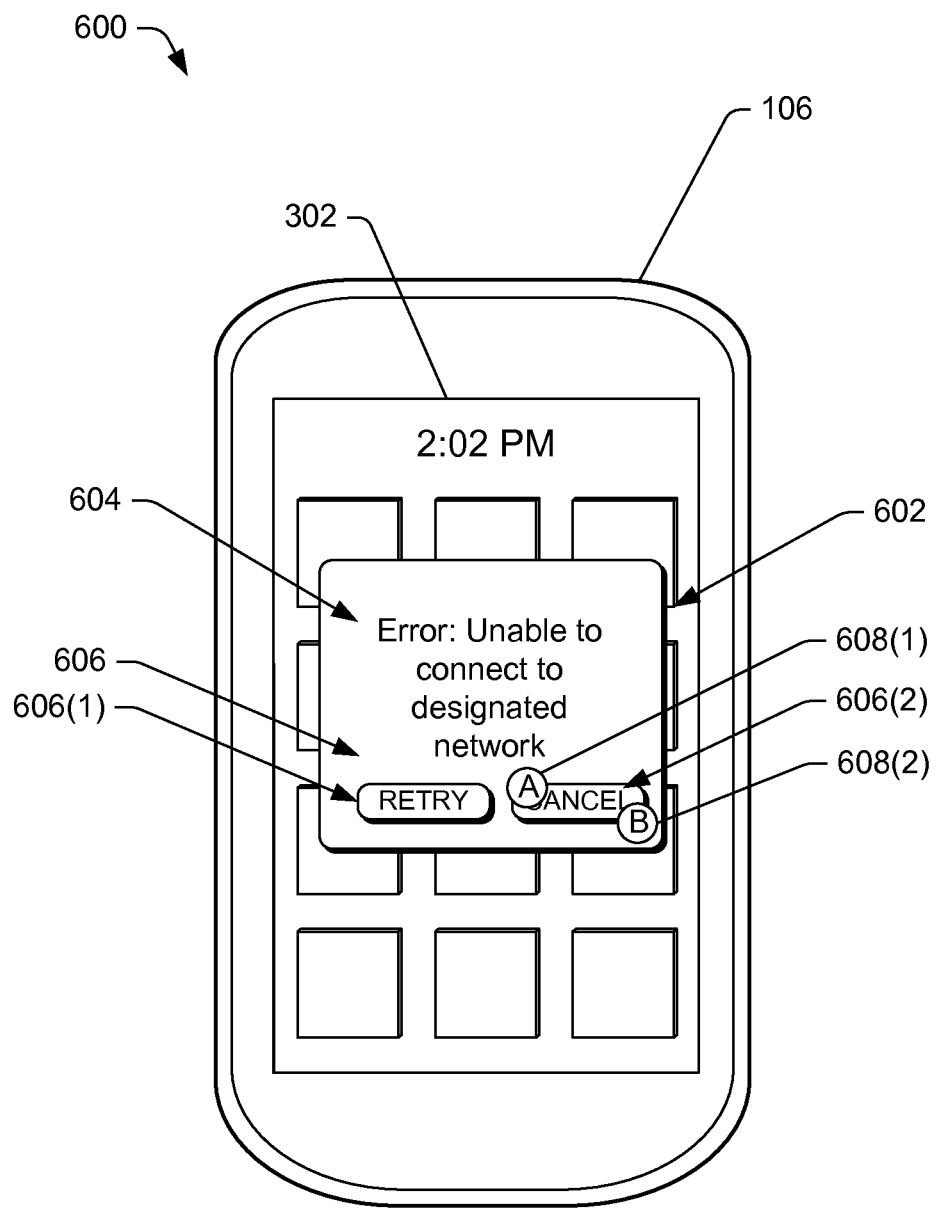
FIG. 6 is an illustrative user interface (UI) that may be analyzed using object recognition to determine a subsequent action to be performed by the robotic device tester.

FIG. 6 is an illustrative user interface (UI) 600 that may be analyzed using object recognition to determine a subsequent action to be performed by the robotic device tester. For example, the optical recognition module 118 may analyze data presented on the UI 600 to determine a subsequent control to be initiated by the test protocol module 116.

In accordance with various embodiments, the camera 220 may record imagery of the touch screen device 106, which includes the UI 600 having a window 602 that includes a message 604 and various commands 606. The optical recognition module 118 may analyze the UI 600, such as by inspecting or otherwise processing imagery from the camera 220. The optical recognition module 118 may determine the appearance of the window, which may be displayed in response to (or after) a previous action (e.g., a tap or slide engagement by the tip 206 with the touch screen 302). The optical recognition module 118 may further use optical character recognition (OCR) to interpret the message. For example, the optical recognition module 118 may determine that the message 604 includes the term "error", which may then cause the testing protocol to perform an action such as cancel the test procedure, request user assistance, perform an action based on the message, or perform another type of action.

The optical recognition module 118 may also identify the commands, such as commands 606(1), 606(2), or other commands, which may be evident by known patterns, borders, or other features. For example, the optical recognition module 118 may identify boundaries of the command 606(2) based on locations 608(1) and 608(2). The optical recognition module 118 may determine that the command 606(2) is associated with an action of "cancel" by performing an OCR operation to the area within the boundary of the command (defined by 608(1) and 608(2)). In some embodiments, the optical recognition module 118 may determine a presence of other selectable commands rendered on the touch screen, such as links (e.g. hyperlink, etc.), radial buttons, check boxes, and so forth. For example, a region of interest (ROI) may be the entire screen for the OCR. The optical recognition module 120 may then return "box" coordinates for words that are found and can be acted upon. In accordance with embodiments, the optical recognition module 118 may transmit the information collected based on the UI 600 to the test protocol module 116, which may then instruct the robot 202 to move the tip 206 to select the command 606(2) (or another command) in response to the presentation of the message 602 in the UI. In some embodiments, the platform manager 112 may store various commands, which when identified via the optical recognition module 118, may be used to instruct the test protocol module 116 how to proceed with a test in response to a message from the touch screen device 106.

Figure 7:
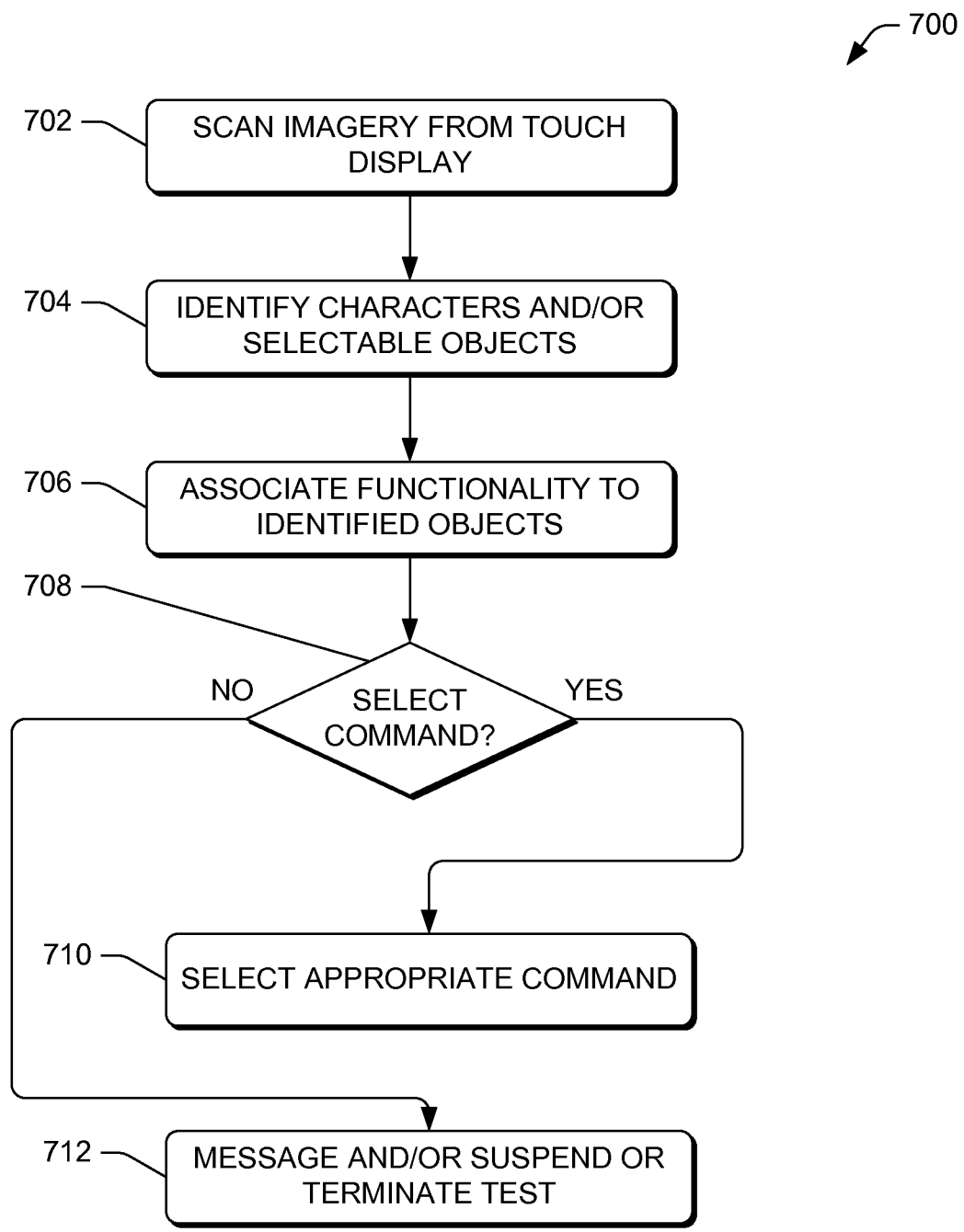
FIG. 7 is a flow diagram of an illustrative process to perform object recognition.

FIG. 7 is a flow diagram of an illustrative process 700 to perform object recognition. The process may be implemented by the test protocol module 116 and the optical recognition module 118 and is discussed with reference to the previous figures.

At 702, the optical recognition module 118 may analyze imagery received from the camera 220. The analysis may include OCR and optical shape recognition using known borders, styles, or other characteristics of virtual buttons or other features that may be interacted with via the tip 206 (e.g., hyperlinks, radial buttons, check boxes, virtual keyboard keys, etc.).

At 704, the optical recognition module 118 may identify characters (text, numbers, symbols, etc.) and/or selectable objects from the received imagery.

At 706, the optical recognition module 118 may associate functionality to the identified selectable objects. For example, the optical recognition module 118 may determine that a message (e.g., the message 602) is an error message because the message includes the word "error" or another word with similar meaning. The optical recognition module 118 may further determine that the message includes at least one selectable command that is associated with the "error" and includes text of "retry". The optical recognition module 118 may associate the command object as a command to re-execute a previous action performed by the robot 202 caused by the tip 206 engaging the touch interface.

At 708, the test protocol module 116 may determine whether to perform an action based on the association performed at the operation 706. In accordance with some embodiments, the test protocol module 116 may determine to select a command (via the route "yes") at 708. The test protocol module 116 may then instruct the robot 202 to cause the tip 206 to engage the command on the touch screen 302 to active the command at 710.

In some embodiments, the test protocol module 116 may take action other than selecting the command at the decision operation 708. The test protocol module 116 may follow the route "no" from the decision operation 708, which at 712 may display messaging or otherwise terminate or suspend the testing process. In some embodiments, the test protocol module 116 may wait or otherwise continue the test process at the operation 712 rather than terminating the process. For example, the error message may expire after some passage of time and the test may then continue.

Illustrative Tip Configurations and Multi-Touch

Figure 8:
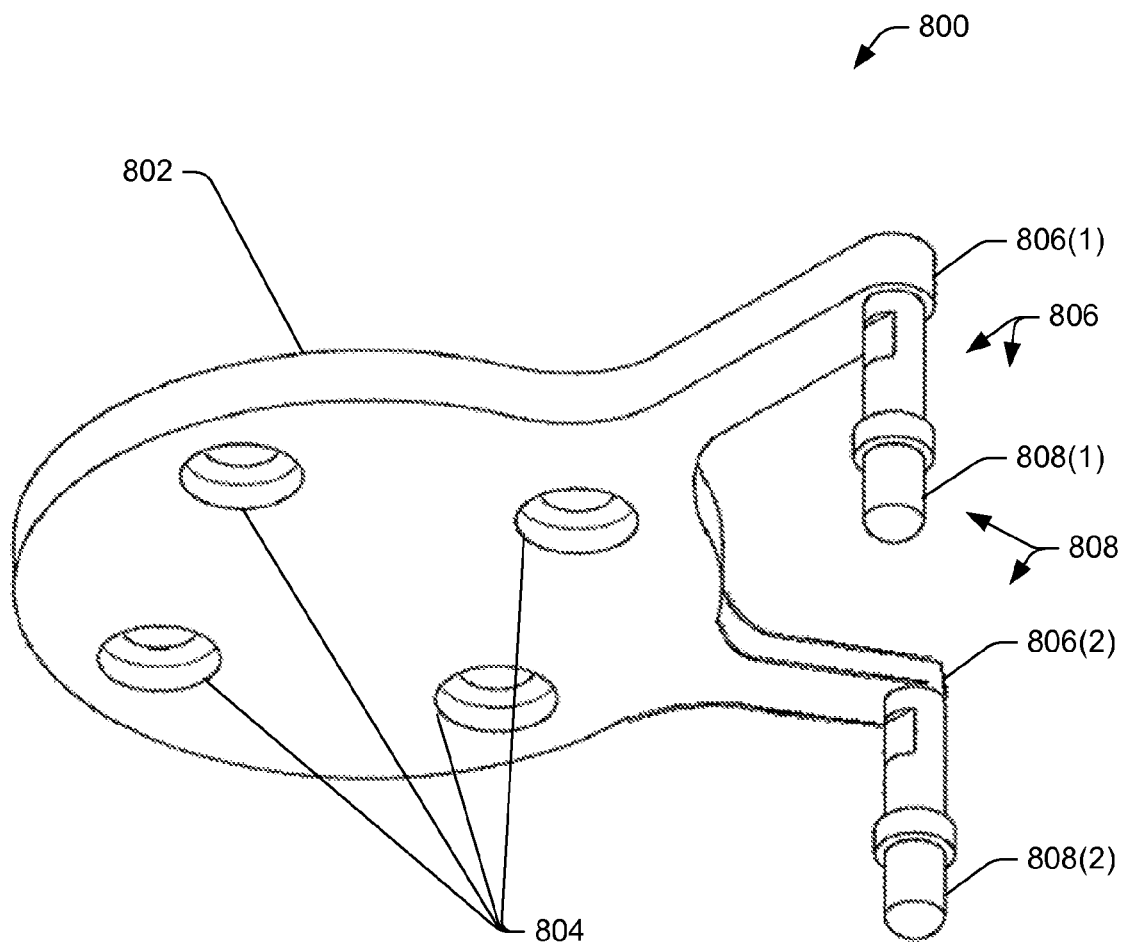
FIG. 8 is an isometric view of an illustrative plate assembly having multiple tips that may be selectively used to engage the touch screen of the touch screen enabled electronic device.

FIG. 8 is an isometric view of an illustrative plate assembly 800 having multiple tips that may be selectively used to engage the touch screen device. The plate assembly 800 may include a plate 802 with mounting apertures 804 to enable coupling the plate to the robot 202. Arms 806 may be coupled to the plate 802, such as by a threaded connection, being integrally formed with the plate, or by other means. The arms 806 may be protrusions that are substantially perpendicular to the plate 802. Tips 808 may be attached to the distal end of the arms 806. The tips 808 may be formed of a conductive rubberized material or a similarly flexible conductive material that may engage a touch screen without damaging the touch screen.

The plate assembly 800 may include two or more arms. In some embodiments, the plate assembly 800 may include a first arm 806(1) and a second arm 806(2), each have one of tips 808(1) and 808(2), respectively. Although the plate assembly 800 shown in FIG. 8 includes two arms, additional arms may be included in the plate assembly. The tips 808(1) and 808(2) may be formed using different specifications, such as a type of material, a size, a density, or other specification. In some instances, the tips may be designed to simulate different pointing features that engage the touch screen, such as an index finger, a thumb, a stylus, or other pointing features. By include two more tips in the plate assembly, the robot 202 may select a tip from various tips to use to engage the touch screen, and thus simulate or test the functionality of the touch screen accordingly without any downtime or delay necessary to change tips when the plate assembly only includes a single arm and tip.

Figure 9A:
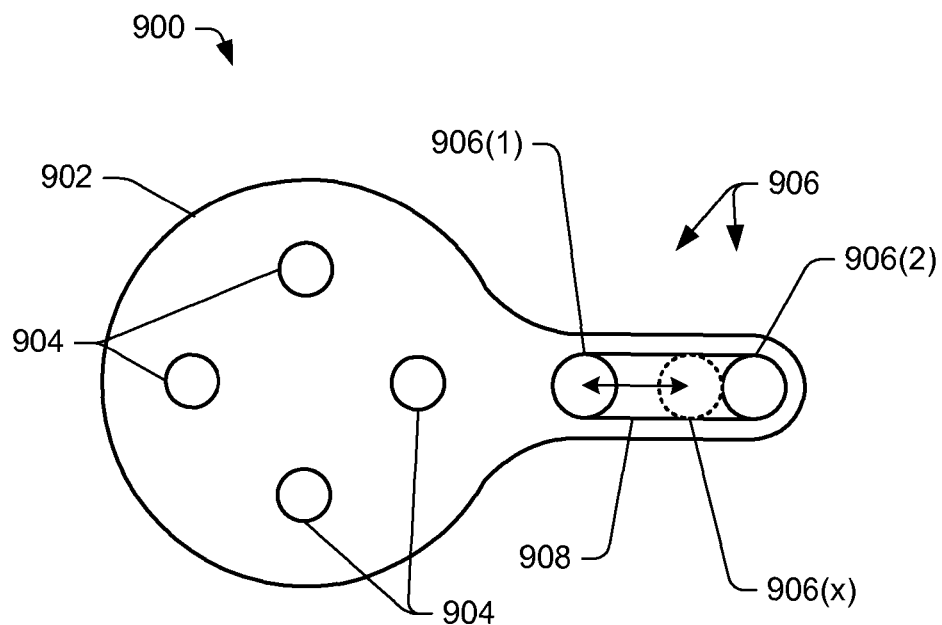
FIG. 9A is a top view of another illustrative plate assembly capable of performing multi-touch operations on the touch screen of the touch screen enabled electronic device.
Figure 9B:
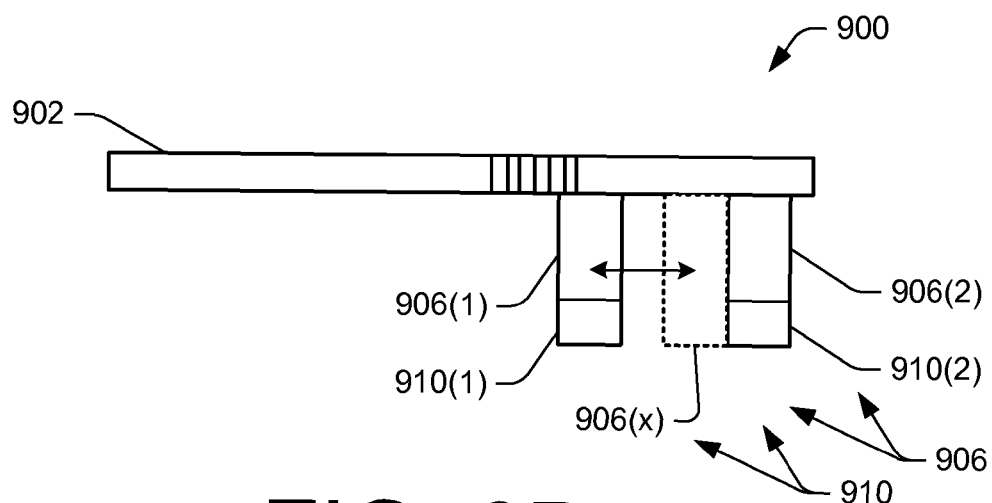
FIG. 9B is a side elevation of the illustrative plate assembly shown in FIG. 9A.

FIGS. 9A and 9B show a top view and a side elevation view, respectively, of an illustrative plate assembly 900 capable of performing multi-touch operations on the touch screen device. Referring to FIG. 9A, the plate assembly 900 may include a plate 902 with mounting apertures 904 to enable coupling the plate to the robot 202. The plate may include two or more arms 906, which may include at least one arm that is movable with respect to the plate 902. As shown in FIG. 9A, a movable arm 906(1) may be configured to traverse along a path 908 between a first location shown at the position of the arm 806(1) and a second position 806(x). By traversing relative to the plate and relative to a fixed arm 906(2), the plate assembly 900 may be used by the robot 202, under control of the controller 102, to perform multi-touch operations where two or more tips simultaneously or nearly simultaneously engage the touch screen and then move relative to one another via the moveable 906(1) arm and the fixed arm 906(2). For example, using the plate assembly 900, the controller 102 may cause the tips 910 to perform a zoom-in or a zoom-out input by engaging the tips against the touch screen and either moving the tips together or apart, respectively. As shown in FIG. 9A, the movement of the moveable arm 906(1) is in a linear direction toward the fixed arm 906(2), however, the moveable arm 906(1) may also be moved in a curved path to simulate finger movement of a human when interacting with a touch screen.

In accordance with various embodiments, the movable arm 906(1) may be moved using an actuated arm, a belt, gears, or by other known means to move the movable arm 906(1) with respect to the fixed arm 906(2) while moveably coupled to the plate 902. In some embodiments, additional moveable arms may be implemented to simulate three-finger, four-finger, or five-finger commands (multi-touch engagements) with the touch screen.

In some embodiments, one of the movable arms 906 may be adjustable in the z-direction (manually, automatically, etc.) to enable multi-touch operations where each arm touches the screen at the same time. Another way to solve this problem is to align the robot device tester 104 to be perpendicular to the z-axis, which would then align each arm along a same plane assuming the arms are of equal length.

Figure 10:
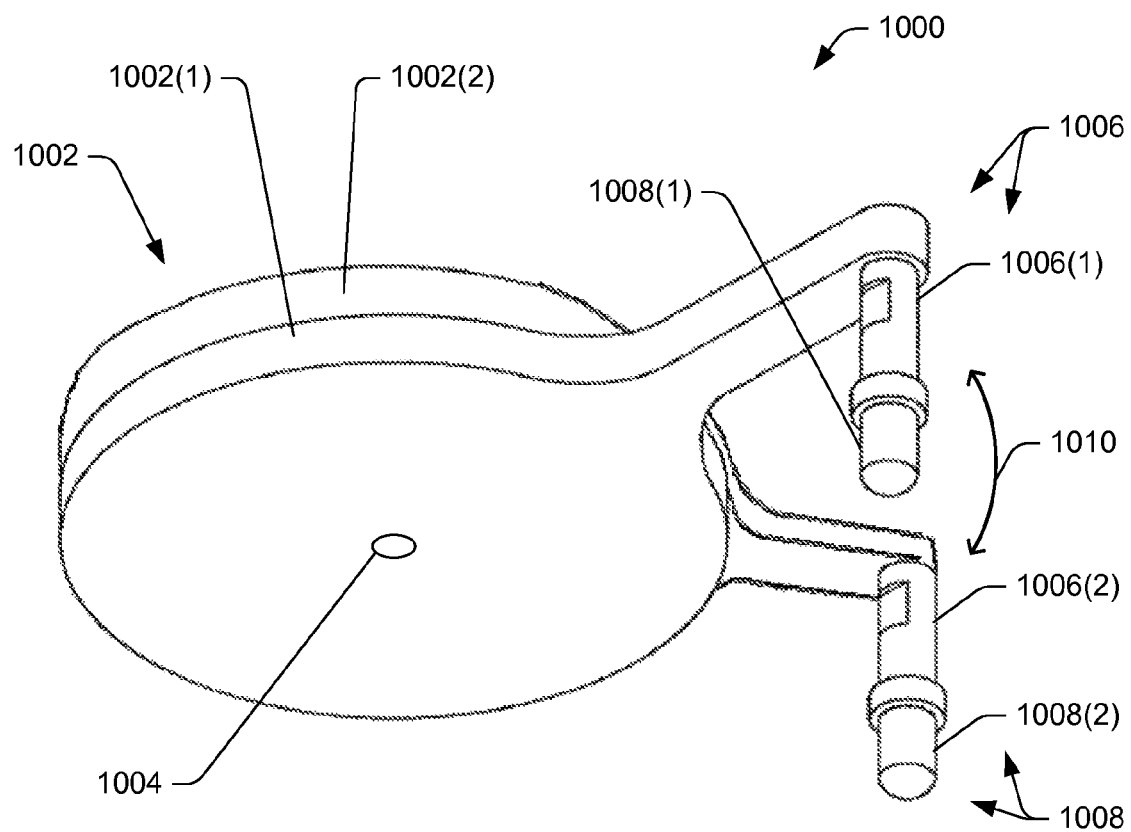
FIG. 10 is an isometric view of yet another illustrative plate assembly configured to perform multi-touch operations on the touch screen of the touch screen enabled electronic device.

FIG. 10 is an isometric view of another plate assembly 1000 configured to perform multi-touch operations on the touch screen device. The plate assembly 1000 may include two or more plates 1002 which may rotate about an axel 1004. Each plate 1002(1), 1002(2) may include an arm 1006(1), 1006(2) and a tip 1008(1), 1008(2), respectively. By rotating about the axel 1004, the plates 1002 may capable of translating the arms 1006 and tips 1008 in a curved path either toward or away from one another to simulate multi-touch operations when the tips are engaged against the touch screen 302.

In some embodiments, the tips 1008 may include the same or different types of tips, which may be used to simulate multi-touch operations performed by a human operator of the touch screen device. In some embodiments, the tip 1008(1) may simulate a thumb while the tip 1008(2) may simulate an index finger or another finger other than the thumb.

In accordance with various embodiments, additional arms 1006 and tips 1008 may be implemented on the plate 1002 and/or additional plates having arms and tips may be added to the plate assembly to simulate, for example, multi-touch operations with three, four, or five fingers of a human operator of the touch screen device. During a test process, some of the arms may engage against the touch screen and perform a slide operation while other arms by perform a static touch (tap with a duration), thereby enabling the test protocol module 116 to perform operations such as scrolling, zooming, and other types of multi-touch operations.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method comprising:
storing calibration reference locations at three or more corners of a touch screen when a tip engages the touch screen at each of the corners, the calibration reference locations to calibrate a controller that provides instructions to a robot to move the tip to selectively engage the touch screen of a touch screen device;
identifying a planar surface representative of the surface of the touch screen based at least in part on the stored calibration reference locations;
generating a reference coordinate system across the planar surface that aligns with the touch screen;
receiving an instruction to cause the robot to move the tip to a predetermined location that is specified using the reference coordinate system; and
executing the instruction to cause the robot to move the tip to engage the touch screen and thereby provide an input to touch screen device.

2. The method as recited in claim 1, wherein the instruction is at least one of a tap movement to engage the tip to a single location on the touch screen or a slide movement to drag the tip across a portion of the touch screen.

3. The method as recited in claim 1, further comprising securing the touch screen device to a device fixture with the touch screen exposed to the tip.

4. The method as recited in claim 1, further comprising adjusting an orientation of the robot to align with the planar surface by rotating the robot via the roll ($\phi$) and/or pitch ($\theta$) such that a z-axis of the robot is perpendicular to the planar surface.

5. The method as recited in claim 1, wherein generating the reference coordinate system across the planar surface includes setting $\{x, y, z\}$ coordinates to $\{0, 0, 0\}$ at a first corner of the touch screen, setting the coordinates to $\{0, y_{max}, 0\}$ at a second corner of the touch screen, and setting the coordinates to $\{x_{max}, 0, 0\}$ at a third corner of the touch screen.

6. The method as recited in claim 1, further comprising selecting the tip from a plurality of available tips configured on a plate assembly, the plurality of available tips secured on a distal end of an arm that is attached to a plate under control of the robot.

7. The method as recited in claim 1, wherein the instruction is a multi-touch operation that causes two or more tips to engage the touch screen simultaneously or nearly simultaneously to provide input to the touch screen device.

8. A system, comprising:
a robot to provide inputs to a touch screen of a touch screen device, the robot to move an arm configured with a tip at a distal end of the arm, the tip configured to engage the touch screen of the touch screen device and provide the inputs that are recognizable by the touch screen device; and
a controller to identify and store a reference coordinate system of the touch screen and to control movement of the tip by the robot using the reference coordinate system.

9. The system as recited in claim 8, further comprising the touch screen device secured to a device fixture, the touch screen device having the touch screen that is accessible when the touch screen device is in the device fixture.

10. The system as recited in claim 8, further comprising a camera to record imagery rendered by the touch screen device, the imagery being transmitted to the controller to enable object recognition.

11. The system as recited in claim 10, wherein the controller is configured to control the robot to interact with the touch screen device in response to the imagery recognized by the object recognition.

12. The system as recited in claim 8, wherein the arm is a first arm and the tip is a first tip, and wherein the robot includes a second arm having a second tip at the distal end of the arm.

13. The system as recited in claim 12, wherein the second arm is movable independent of the first arm to enable the first tip and the second tip to perform multi-touch operations when engaged against the touch screen.

14. An apparatus to perform automated testing of a touch screen device, the apparatus comprising:
- a plate assembly including at least one arm protruding from the plate and having a tip coupled to a distal end of the at least one arm, the tip to engage a touch screen of the touch screen device to simulate user interaction with the touch screen device; and
- a robotic arm coupled to the plate assembly to provide three directional movement to the plate assembly and rotational movement about a z-axis to rotate the plate assembly.

15. The apparatus as recited in claim 14, wherein the plate assembly includes a plate having at least two fixed arms that protrude from the plate in a direction perpendicular to a surface of the plate and near the edge of the plate, the arms being separated by a distance that is greater than a width of a touch screen device, the plate to enable the robotic arm to select a tip from the at last two fixed arms to engage the touch screen.

16. The apparatus as recited in claim 14, wherein the plate assembly includes a plate having a fixed arm and a movable arm that protrude from the plate in a direction perpendicular to a surface of the plate and near the edge of the plate, the arms to enable simultaneous engagement of the touch screen to perform multi-touch operations.

17. The apparatus as recited in claim 14, wherein the plate assembly includes a first plate and a second plate that are configured to independently rotate relative to one another under power of the robotic arm, the first plate having a first arm that protrudes from the first plate in a direction perpendicular to a surface of the first plate and near the edge of the first plate, the second plate having a second arm that protrudes from the second plate in a direction perpendicular to a surface of the second plate and near the edge of the second plate, the first and second tips to enable simultaneous engagement of the touch screen to perform multi-touch operations.

18. The apparatus as recited in claim 17, wherein the first tip is different than the second tip.

19. The apparatus as recited in claim 14, wherein the tip is formed of a conductive rubber material.

20. The apparatus as recited in claim 14, further comprising a camera to record imagery rendered on the touch screen, the imagery processed by a controller to determine a subsequent movement of the robotic arm.

\* \* \* \* \*